US006933030B1

(12) United States Patent
Paterni

(10) Patent No.: US 6,933,030 B1
(45) Date of Patent: Aug. 23, 2005

(54) CONTINUOUS WEB OF FLEXIBLE PLASTIC STRIPS FOR STRIP DOOR SYSTEMS

(75) Inventor: Richard Michael Paterni, McDonald, PA (US)

(73) Assignee: TMI Incorporated, Pittsburgh, PA (US)

( * ) Notice: Subject to any disclaimer, the term of this patent is extended or adjusted under 35 U.S.C. 154(b) by 108 days.

(21) Appl. No.: 10/360,421

(22) Filed: Feb. 7, 2003

(51) Int. Cl.[7] .......................... B65D 65/28; B32B 3/10; E04F 10/08; E06B 9/08

(52) U.S. Cl. ........................ 428/43; 428/131; 428/156; 160/32; 160/115; 160/130

(58) Field of Search ................................ 428/156, 131, 428/43; 160/DIG. 8, 32, 115, 117, 130, 185–187, 160/218

(56) References Cited

U.S. PATENT DOCUMENTS

| | | | | |
|---|---|---|---|---|
| 1,900,987 A | | 3/1933 | Goff | |
| 3,421,568 A | * | 1/1969 | Youngs | 160/310 |
| 3,490,123 A | | 1/1970 | Clark | |
| 3,527,859 A | * | 9/1970 | Fairbanks | 264/177.16 |
| 4,150,184 A | * | 4/1979 | Tesch | 428/43 |
| 4,165,778 A | | 8/1979 | Smith | 160/332 |
| 4,217,327 A | * | 8/1980 | Cancio et al. | 264/293 |
| 4,340,633 A | | 7/1982 | Robbins, Jr. | 428/99 |
| 4,465,729 A | * | 8/1984 | Cancio et al. | 428/167 |
| 4,524,894 A | | 6/1985 | Leblond | 225/2 |
| 4,646,364 A | | 3/1987 | O'Larey | 2/49 R |
| 4,666,752 A | | 5/1987 | Broermann | 428/43 |
| 5,100,710 A | | 3/1992 | Rizzuto | 428/43 |
| 5,127,460 A | | 7/1992 | Abadi et al. | 160/332 |
| 5,450,890 A | * | 9/1995 | Pinkalla et al. | 160/121.1 |
| 6,394,171 B1 | * | 5/2002 | Robbins, III | 160/184 |

* cited by examiner

*Primary Examiner*—Harold Pyon
*Assistant Examiner*—Patricia L. Nordmeyer
(74) *Attorney, Agent, or Firm*—Armstrong, Kratz, Quintos, Hanson & Brooks, LLP

(57) ABSTRACT

A continuous web of flexible plastic strips, for use in a flexible strip door system, the continuous web of flexible plastic strips having uninterrupted cuts, of a depth less than the thickness of the web, arranged along lines which are perpendicular to the longitudinal edges of the web. Remaining material of the web, which is located below each cut, provides sufficient strength along the length of the web to prevent severing during routine handling, but allows for manual tearing of the web along the cuts when the web is subjected to opposing forces perpendicular to upper and lower faces of the web on either side of the cut.

13 Claims, 3 Drawing Sheets

CONTINUOUS WEB OF FLEXIBLE PLASTIC STRIPS FOR STRIP DOOR SYSTEMS

FIELD OF THE INVENTION

The present invention relates to the field of flexible strip doors used for providing a barrier in a vertical plane to the movement of air, liquids, vapors, particular matter, insects, etc. while allowing for substantially free movement of personnel, equipment, product, or the like through the barrier.

BACKGROUND OF THE INVENTION

Flexible strip door systems, having a plurality of vertically hanging flexible strips with longitudinal edges in either abutting or overlapping arrangement, are used in many varied applications as a barrier in a vertical plane, while still allowing for substantially free movements of personnel, equipment, product, or the like through the barrier by simply parting and/or bending the hanging flexible strips. Throughout this document the terminology "strip door" is found, however in certain applications in the field of the invention the terminology "strip curtain" is used. The present invention is applicable to all types of installations using flexible plastic strips. Examples of where flexible strip door systems are utilized include: entryways into coolers, freezers, heated/cooled rooms, and processing areas; loading doors for entry onto loading docks; openings of product display cases in supermarkets; areas of high heat output within a production area; and areas within a production area at which fumes, particulate matter, liquid droplets, etc. are to be contained. Although flexible strip door systems are used to a large extent as a barrier to the movement of air across a selected vertical plane, which can lead to a substantial savings in heating and/or cooling costs, the system is also used as a barrier to, for example, particulate material, fumes, liquids in droplet form, insects, and noise.

Flexible strip door systems are typically made up of a plurality of flexible plastic strips, often clear so as to provide a see-through feature, having a width in a range of 4–16 inches, a thickness in a range of 0.060 to 0.160 inches, and a length which can vary from several inches to any length required to provide the desired barrier. The flexible plastic strips are most often hung from hangers having a horizontally oriented rod, or a series of evenly spaced horizontally projecting studs. In use of the rod system, loops are formed at tops of each plastic strip and the loops are slid successively over an end of the rod, in an abutting arrangement, in order to obtain the door barrier. In use of the system having projecting studs, evenly spaced apertures, which correspond to the spacing of the evenly spaced studs, are provided along a top edge portion of each strip and the strips can be easily arranged on the hanger by inserting the studs through the apertures.

The stud-type hanger system is more advantageous as the strips can easily be arranged to have a pattern ranging from one in which longitudinal edges of the strips abut each other to a pattern in which portions of the strips overlap each other. With the stud-type hanger system, the overlap can be selected to be in any increment corresponding to the spacing of the studs. Another advantage of the stud-type system is realized when replacement of a few strips is necessary, as only the strips to be replaced need to be unfastened, while not disturbing the remaining strips. Depending on the amount of usage and the type of equipment passing through the barrier, replacement of individual strips is usually required over the life of the flexible strip door system.

Whether for a new installation or for replacing worn or damaged strips, inventorying, shipping and handling of the strips is difficult due to the often long length of each strip. For example a flexible strip door system for a warehouse loading dock might require strips which are 10 to 16 feet in length. Although the strips can be stacked upon each other, the excessive length makes handling of a large number of stacked strips difficult. Folding the strips is not a good solution, as it can result in permanent distortion to the shape of the strips, thus not providing a barrier having good sealing properties. Winding individual strips upon each other for shipping and handling is difficult and the resulting arrangement is awkward to handle.

OBJECTS OF THE INVENTION

It is an object of the present invention to provide a product which facilitates storing, shipping and handling of plastic material to provide strips for flexible strip door systems.

It is another object of the present invention to provide a product which provides strips for flexible strip door systems which are free of permanent distortions to the desired shape of the material of the strips.

It is a further object of the present invention to provide a product in which individual flexible strips, in ready to hang condition, are readily available in an easy-to-use form.

It is still a further object of the present invention to provide a product in which convex/concave characteristics found in the individual flexible strips are easily identified.

SUMMARY OF THE INVENTION

The present invention is a continuous web of flexible plastic strips of a selected length and selected thickness for use in a flexible strip door system. The continuous web of flexible plastic has a length exceeding the combined length of two flexible plastic strips. An upper face of the continuous web has therein an uninterrupted cut, to a depth less than the selected thickness, along cutting lines which are perpendicular to and extending between longitudinal edges of the continuous web. The cutting lines have a spacing, along the length of the continuous web, corresponding to the selected length of the flexible plastic strips. Another embodiment of the invention includes rows of uniformly spaced apertures, wherein one row of apertures is adjacent to each cutting line. In another embodiment of the invention the continuous web is wound upon itself to form a coil.

DESCRIPTION OF THE DRAWINGS

The invention will become more readily apparent from the following description of preferred embodiments thereof shown, by way of example only, in the accompanying drawings wherein.

DETAILED DESCRIPTION

Figure 1:
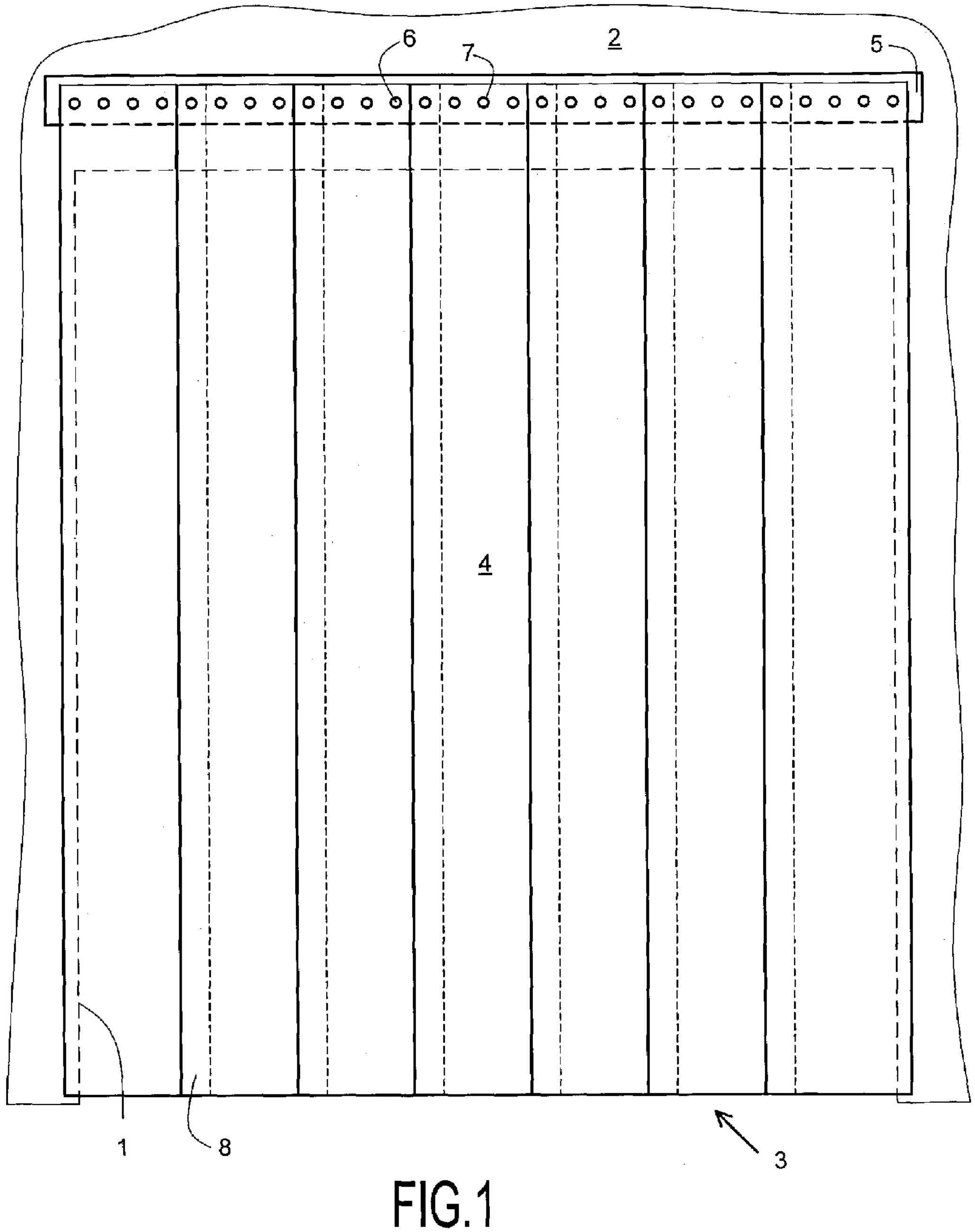
FIG.1 Prior Art
FIG. 1 is a flexible strip door system wherein flexible plastic strips are shown in an installed conditions.

The present product is a continuous web of flexible plastic strips. The product facilitates storing, shipping, handling and installing of flexible plastic material for either a new flexible strip door system or for replacement strips in an existing flexible strip door system. FIG. 1 depicts a flexible strip door system wherein flexible plastic strips are used. In FIG. 1, entryway 1 in partition 2 is provided with a barrier to air flow with use of flexible strip door system 3. Such a system might be installed across an entryway to a freezer or a cooler, through which workers have need to pass numerous times while carrying out their work. In such a situation, a solid hinged door, for example, would impede easy access to the enclosure. Use of flexible strip door system 3 allows workers to easily pass through the entryway, either on foot or a fork lift, for example, by merely briefly separating vertically hanging flexible plastic strips 4 and/or bending the strips upwardly or sideways. Use of the flexible door system can provide significant savings in energy requirements, as movement of air is substantially eliminated by the door system 3. In a properly designed system, the length of the flexible plastic strips is made to have the strips hang to the surface of the floor of the facility.

A preferred method of hanging the flexible plastic strips is to provide a hanger 5 having uniformly spaced studs 6 extending outwardly in a substantially horizontal orientation. The flexible plastic strips are each provided with uniformly spaced apertures 7, along a top end portion of the strip, having a spacing corresponding to the spacing of the studs 6 of the hanger 5. Installation of the strips is carried out by sliding apertures 7 of the strips 4 over the studs 6. Such a system allows for virtually any pattern for the strips ranging from a pattern having longitudinal edges of the strips abutting longitudinal edges of adjacent strips, to a pattern having the strips overlap each other to an extent where a double thickness of the strips is provided across the width of the opening 1. In the installation depicted in FIG. 1, an overlap of about 25% of each strip is shown at 8. In general, the overlap amount is a multiple of the spacing of the studs and the apertures. Following installation of the strips over the studs, a cap or other means can be provided to prevent the strips from sliding off the ends of the studs.

Figure 2:
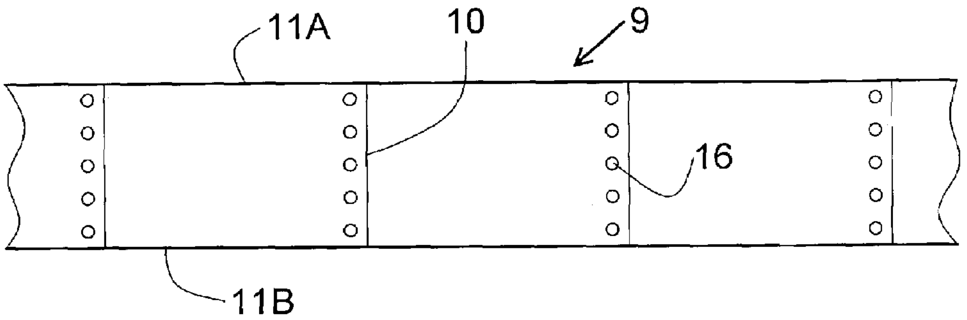
FIG. 2 is a plan view of the continuous web of the present invention.

The present invention provides flexible plastic strips in a form which facilitates storing, shipping, handling, and installing. In FIG. 2, a plan view of a continuous web of flexible plastic material of the invention is shown. In FIG. 2, a continuous plastic web 9, which is preferably formed of PVC (polyvinyl chloride), has in an upper face, cuts 10 which extend along lines which are perpendicular to both longitudinal edges 11A and 11B of the web and extend from edge 11A to edge 11B. The cuts 10 are of an uninterrupted or continuous nature from edge to edge, and as best viewed in the enlarged view of FIG. 3, each cut 10 is made to a uniform depth which is in a range of 60% to 90% of the selected thickness t of the material of the web. As a result 10% to 40% of the plastic material below the cut is in an uncut condition, as indicated at 12. With such manner of cutting, a bottom portion 12 of the web 9 is left in a continuous condition from end to end of the web. The depth of cut 10 is selected to be that which: (1) provides a continuous intact web when the web is subjected to longitudinal forces such as indicated at 13, which might be experienced during processing and handling, and 2) allows for easily severing of the web by providing manual tearing forces begun at one of edges 11A or 11B, in which a force substantially perpendicular to an upper face is applied on one side of the cut, and a force substantially opposed to that force is applied to a lower face on the other side of the cut as indicated at 14A and 14B in FIG. 3. The preferred depth of the uninterrupted cut 10 for PVC of a grade commonly used for strip door systems is equal to about 85% of the thickness of the material. The remaining, uncut portion of the web, indicated at 12 in FIG. 3, should have at the least sufficient strength to prevent severing when unwinding a wound coil of the web by pulling an end of the web and having the coil rotate to unwind. The product of the invention, in coil form, is shown in FIG. 4 at numeric indicator 15. An advantage to having the product of the invention in coil form is that a slight concave/convex characteristic provided across a width of each flexible plastic strip is easily identified as the concavity, for example, is always facing either inward or outward on the roll. The use of material having such concavity/convexity improves the effectiveness of the barrier, as better contact is made between surfaces of the overlapping strips.

Figure 3:
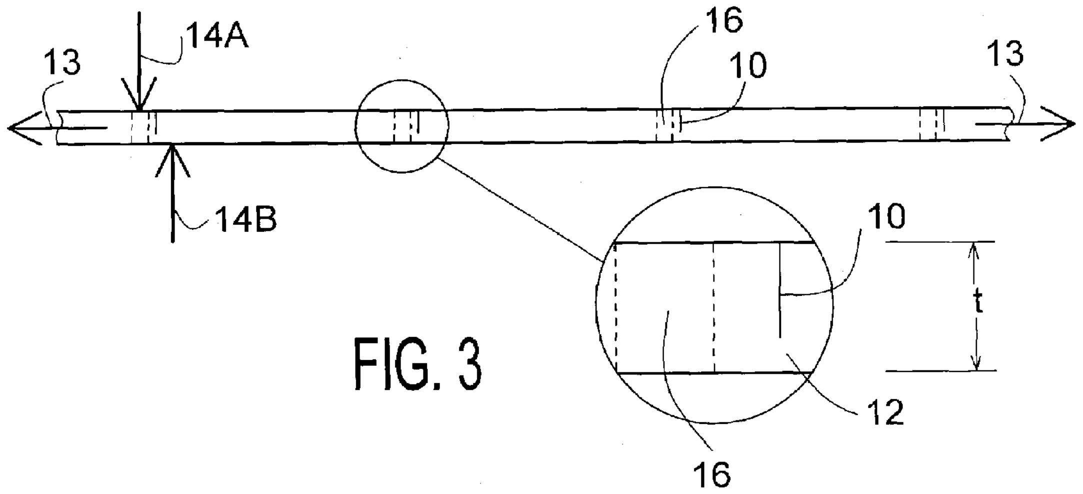
FIG. 3 is an edge view of the continuous web of the present invention with an inset showing a portion of the web enlarged.
Figure 4:
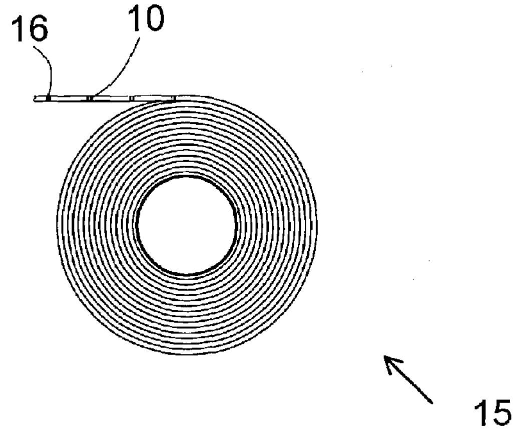
FIG. 4 is an embodiment of the present invention wherein the continuous web of flexible plastic is wound upon itself to form a coil.

As is also shown in FIGS. 2 and 3, a series of apertures 16, arranged in a row, can be punched or otherwise formed in the web at a selected distance away from cut 10. The apertures are formed to have a spacing equal to the spacing of the studs of the hanger upon which the flexible plastic strips are to be hung. If the spacing of the installation in which the flexible plastic strips are to be used is not known, the apertures are not provided. In an embodiment wherein the continuous web is in coil form, the preferred sequence, for material being unwound from the coil, is to have the series of apertures 16 follow the cut 10. Such arrangement facilitates using the flexible plastic strips when torn from the continuous web.

The present invention, as depicted in FIGS. 2, 3 and 4, provides a very convenient, compact, and easily used product which can be stored, shipped, and handled in a very efficient manner, and the product is not subjected to handling and packaging conditions which can result in permanent distortion to the flexible plastic material.

In installing a new flexible strip door system, or replacing strips of an existing flexible strip door system, no cutting or punching is required, and no tools are needed to prepare the strips. Strips which are of a specified length, thickness, and width are easily severed from the continuous web by simply unwinding a portion of the web and tearing along the line at which the web is partially cut. Having the above-described apertures 16 allows for simple placement of the strips over the protruding studs of the hanger. With partial cutting of the web taking place along cutting lines which are determined under shop conditions, as compared with field conditions, correct and uniform length of all of the strips of the door system is assured, thus providing a high quality installation.

FIGS. 5–8 show vertical sectional views of the present invention, in a plane through one of the cutting lines, for various embodiments of the invention.

Figure 5:
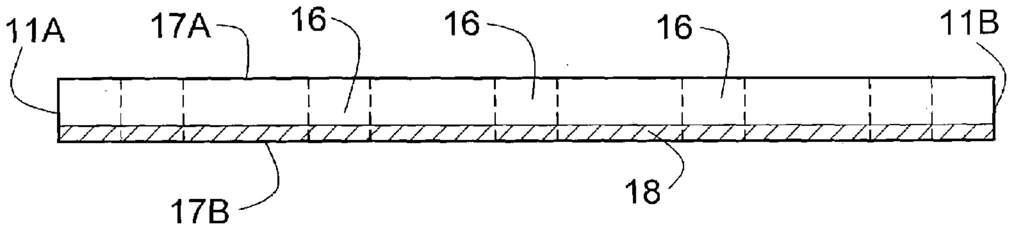
FIG. 5 is a vertical sectional view of a continuous web of the present invention, in a plane through a cutting line, for a continuous web material having planar parallel faces.

FIG. 5 shows the embodiment described above in relation to FIGS. 2 and 3 having upper and lower faces 17A and 17B of the web which are both planar and parallel to each other. Cross-hatched area 18 corresponds to the uncut portion of the web which maintains the web in a continuous form. The product of the invention includes a web of sufficient length so that during use of the product, it can be separable into at least two flexible strips for use in a flexible strip door system. In practice of the invention a continuous web of a length to provide for a plurality of flexible strips is envisioned.

Figure 6:
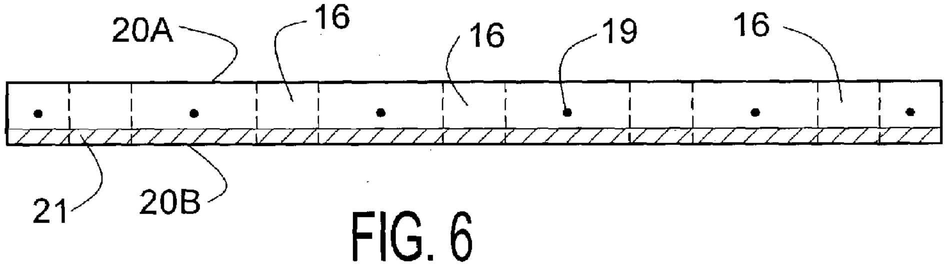
FIG. 6 is a vertical sectional view of a second embodiment of the present invention, in a plane through a cutting line, for a continuous web material having planar parallel faces and reinforcing cords embedded in the material.

FIG. 6 depicts a second embodiment of the invention, similar to the embodiment of FIG. 5, but with strengthening cords 19 extending longitudinally, in parallel spaced relationship, approximately at a midpoint between upper and lower faces 20A and 20B. The strengthening cords can be of nylon, or the like, and their presence helps to prevent elongation of the strips during use. An uncut portion of the web is shown at cross-hatched portion 21. In a preferred embodiment, cords 19 are cut at each cutting line.

Figure 7:
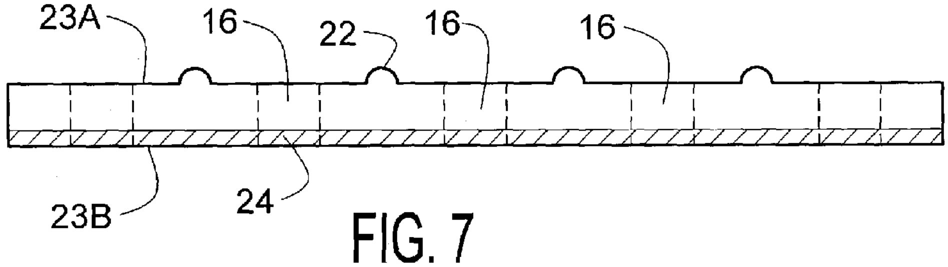
FIG. 7 is a vertical sectional view of a third embodiment of the present invention, in a plane through a cutting line, for a continuous web material having generally planar parallel faces with spaced protruding ribs on a single face.

FIG. 7 depicts a third embodiment of the invention having longitudinally extending ribs 22 protruding above the generally planar upper face 23A of the web material. The ribs give the strips some additional strength in the longitudinal direction as well as providing some protection from scratching of face 23A during use. Cross hatched portion 24 corresponds to the uncut portion of the web. The uncut portion 24 is preferably located adjacent to planar lower face 23B.

Figure 8:
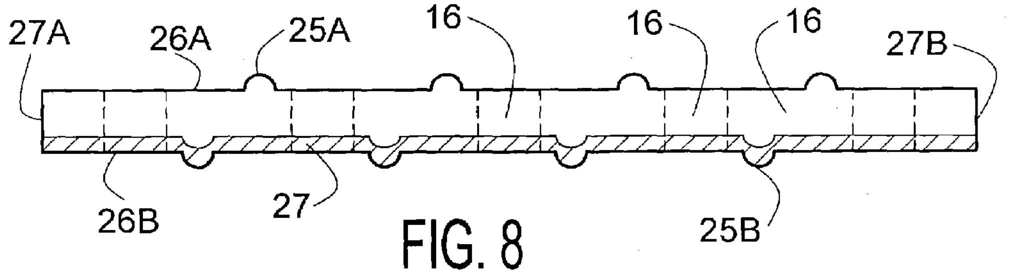
FIG. 8 is a vertical sectional view of a fourth embodiment of the present invention, in a plane through a cutting line, for a continuous web material having generally planar parallel faces with spaced protruding ribs on both faces.

FIG. 8 depicts a fourth embodiment having longitudinally extending ribs 25A and 25B on both faces of the otherwise planar upper and lower faces 26A and 26B. The longitudinally extending ribs give some strength to the strips in the longitudinal direction, as well as some protection from scratching of the planar portions of the faces. Cross-hatched portion 27 corresponds to the uncut portion of the web material.

The preferred method for producing the product of the invention is to provide the cut 10, of a selected depth, with use of a guillotine-type blade having a straight sharpened cutting edge. In the embodiment of FIG. 8, use of the same type cutter is preferred. Because of the flexible nature of the PVC material, the uncut portion 27 tends to be of substantially the same thickness along its length and the uncut portion generally follows the contour of lower face 26B from edge 27A to edge 27B. In all of FIGS. 5 to 8, the vertically oriented interrupted lines depict the rows of apertures 16.

While specific materials, dimensional data, fabricating steps, etc., have been set forth for purposes of describing embodiments of the invention, various modifications can be resorted to, in light of the above teachings, without departing from the novel contributions; therefore in determining the scope of the present invention, reference shall be made to the appended claims.

What is claimed is:

1. A continuous web of flexible plastic strips, of a flexible strip door system, said flexible plastic strips being of a selected length, selected width, and selected thickness for use with hanging means in a flexible strip door system, comprising a continuous web of flexible plastic strips, said continuous web having thickness-defining upper and lower faces and longitudinal edges, and having a length exceeding the combined length of two of said flexible plastic strips, the upper face of said continuous web having an uninterrupted cut, to a depth in the thickness direction less than said selected thickness, along cutting-lines perpendicular to and extending between the longitudinal edges thereof, said cutting lines having a spacing, along the length of said continuous web, corresponding to the selected length of said flexible plastic strips, wherein said continuous web of flexible plastic strips has spaced rows of uniformly spaced apertures therein, a row of said apertures being adjacent each said cutting line.

2. The continuous web of flexible plastic strips as defined in claims 1, wherein said continuous web of flexible plastic is wound upon itself to form a coil.

3. The continuous web of flexible plastic strips as defined in claim 1, wherein said flexible plastic material is PVC.

4. The continuous web of flexible plastic strips as defined in claim 1, wherein the continuous web of flexible plastic is cut to a depth equal to 60% to 90% of said selected thickness.

5. The continuous web of flexible plastic strips as defined in claim 4, wherein said cut is to a depth of about 85% of said selected thickness.

6. The continuous web of flexible plastic strips as defined in claim 3, wherein the thickness of said PVC material is in a range of 0.060 to 0.160 inch.

7. The continuous web of flexible plastic strips as defined in claim 1, wherein said continuous web has parallel planar upper and lower faces.

8. The continuous web of flexible plastic strips as defined in claim 1, wherein said lower face has protruding ribs thereon extending in a longitudinal direction thereof.

9. The continuous web of flexible plastic strips as defined in claim 1, wherein both said upper and lower faces have protruding ribs thereon extending in a longitudinal direction thereof.

10. The continuous web of flexible plastic strips as defined in claim 1, wherein spaced reinforcing cords are embedded in the strips in a longitudinal direction thereof.

11. The continuous web of flexible plastic strips as defined in claim 1, wherein said cords are cut at said cutting lines.

12. A continuous web of PVC strips, said PVC strips of a flexible strip door system, being of a selected length, selected width, and selected thickness for use with hanging means in a flexible strip door system, comprising:

a continuous web of PVC strips, said continuous web having thickness-defining upper and lower faces and longitudinal edges, and having a length exceeding the combined length of two of said PVC strips, the upper face of said continuous web having an uninterrupted cut, to a depth in the thickness direction equal to 60% to 90% of said selected thickness, along cutting-lines perpendicular to and extending between the longitudinal edges of said continuous web, said cutting lines having a spacing, along the length of said continuous web, corresponding to the selected length of said PVC strips, and said continuous web of PVC strips having rows of uniformly spaced apertures therein, a row of said apertures being adjacent each of said cutting lines.

13. The continuous web of flexible plastic strips as defined in claim 9, wherein each said uninterrupted cut along a cutting line, to a depth in the thickness direction less than said selected thickness, leaves remaining an uncut portion of the continuous web which:

includes the protruding ribs of the lower face;

is of a substantially uniform thickness between the longitudinal edges of the continuous web; and has an upper surface having substantially the same contour as the lower face of the continuous web.

* * * * *